United States Patent Office.

EDWARD J. HILL, OF MILWAUKEE, WISCONSIN.

Letters Patent No. 67,052, dated July 23, 1867.

---

IMPROVED MODE OF PUTTING UP MATCHES.

---

The Schedule referred to in these Letters Patent and making part of the same.

---

Be it known that I, EDWARD J. HILL, of the city and county of Milwaukee, and State of Wisconsin, have invented a new and improved Mode of Manufacturing Safes, Cases, Wrappers, and Holders for Matches, Tapers, and Cigar, Gas or Lamp-Lighters; and I do hereby declare that the following is a full and exact description thereof.

The nature of my invention consists in providing for friction or percussion-matches, tapers, and cigar, gas, or lamp-lighters, safes, wrappers, cases, or holders, so constructed that the pasted or dipped ends of the matches, tapers, and lighters are protected from accidental ignition, and that any desired number thereof may be packed or put up in such safes, wrappers, cases, or holders, in such a manner that when any match, taper, or lighter is drawn therefrom, the necessary friction or percussion will be produced, and the same will be ignited for use, thereby saving the necessity of rubbing elsewhere to ignite it.

To enable others skilled in the art to make and use my invention, I will proceed to describe its construction and operation.

I construct my safes, cases, wrappers, or holders of sand-paper, or any other suitable material, by folding the same so as to form a small book, or I make a little book, with insides of the covers sanded or roughened, or lined with sand-paper, or any other suitable material, having, if desired, leaves or layers of sand-paper, or any other suitable material. Between the folds or leaves of this safe, or wrapper, or case, or holder, I place the matches, tapers, or lighters, with their pasted or dipped ends next to and protected by the fold or folds or the back of this book-like safe, case, wrapper, or holder, allowing the other ends to protrude from the front edge of such safe, case, wrapper, or holder, enough to be taken hold of with the fingers to draw them respectively from the safe, wrapper, or holder, whenever they may be wanted for use.

To produce pressure and secure friction or percussion, I either surround the safe, case, wrapper, or holder, when filled with matches, tapers, or lighters, with an elastic band of India rubber or gutta percha, or its equivalent, or insert between the layers, folds, or leaves, and the layers of matches therein, layers or alternate leaves of India rubber or gutta percha, plain, sanded, or roughened, and then fasten the safe, case, wrapper, or holder with twine, wire, or in any other suitable manner, so as to produce even pressure and percussion or friction.

These safes, cases, wrappers, or holders may be made of any desired size, and with any desired or convenient number of folds, layers, leaves, or compartments, and in their manufacture I make use of nearly all the substances now used in the manufacture of books and book-binding, as well as metallic substances, such as gold, silver, tin, brass, lead, copper, white metal, German silver, porcelain, glass, &c., &c.

I disclaim the use of folds and sand-paper, or coils, or rolls, or layers of prepared paper, or other suitable material, when used alone in such manufacture, except in manner or form, or in combination or combinations herein described.

What I claim as my invention, and desire to secure by Letters Patent, is—

1. The use of India rubber or gutta percha to produce either friction or percussion in the manufacture and construction of match-safes, cases, wrappers, or holders, or for safes, cases, wrappers, or holders for tapers and gas, lamp, and cigar-lighters.

2. The use of folded sand-paper, or layers or leaves thereof, or of any other suitable material, in combination with India rubber or gutta percha, to produce friction or percussion in such manufacture.

3. The book-like form of constructing safes, cases, wrappers, and holders for matches, tapers, and cigar, gas, or lamp-lighters, substantially as herein described.

4. The mode of protecting the pasted or dipped ends of matches, tapers, and lighters by a wrapper of folded paper, or any other suitable material, substantially as herein described.

5. The use of folded paper, cloth, leather, or any other suitable material, to protect the ends of the matches, tapers, or lighters, in combination with leaves, layers, or folds of sand-paper, or any other suitable material, substantially as herein described, in such manufacture.

6. The combination of the folded or protection-wrapper with leaves or layers of sand-paper, or any other suitable material, and India rubber or gutta percha, or its equivalent, substantially as herein described.

EDWARD J. HILL.

Witnesses:
   D. G. HOOKER,
   C. A. LOVELAND.